Jan. 20, 1970   C. A. DENNISON   3,490,773
WHEEL CONSTRUCTION

Filed Nov. 6, 1967   2 Sheets-Sheet 1

INVENTOR.
CLIFFORD A. DENNISON
BY Pethybridge, O'Neill & Aubel
ATTORNEYS.

Jan. 20, 1970　　　　C. A. DENNISON　　　　3,490,773
WHEEL CONSTRUCTION

Filed Nov. 6, 1967　　　　　　　　　　　　2 Sheets-Sheet 2

INVENTOR
CLIFFORD A. DENNISON
BY Petherbridge, O'Neill & Ambel

ATTORNEYS.

United States Patent Office 3,490,773
Patented Jan. 20, 1970

3,490,773
WHEEL CONSTRUCTION
Clifford A. Dennison, Itasca, Ill., assignor to Pemco, Inc., Hampshire, Ill., a corporation of Illinois
Filed Nov. 6, 1967, Ser. No. 680,713
Int. Cl. F16j 15/54, 15/44
U.S. Cl. 277—32
12 Claims

ABSTRACT OF THE DISCLOSURE

A wheel construction utilizing a labyrinth-lubricant seal system which permits the use of the wheel in either or both corrosive or abrasive environments. The wheel is fabricated from ductile iron which is annealed and machined to close operating tolerances. The annealed and machined ductile iron wheel is then re-hardened to provide long life. The labyrinth-lubricant seal is designed to keep the wheel and axle or axle bushing lubricated even though this assembly may be frequently submerged for long periods of time in a liquid. The labyrinth, consisting primarily of a plurality of annular discs or plates, provides a means for retaining the lubricant in the area of the wheel which is to be maintained in a lubricated condition. Spacer elements are used to maintain the separation of the annular discs or plates. The lubricant itself serves to provide the primary seal of the assembly being of a sufficiently high viscosity at the operating temperatures of the wheel to prevent contamination of the lubricated surfaces by corrosive or abrasive substances.

---

Wheels of the type provided by the invention are widely used in conveying systems in the mining, incineration, and cement industries. These metal wheels, however, can have application as idler wheels in endless-type earth moving vehicles or track-driven vehicles and a wide variety of other equipment requiring high-strength metal wheels which can be produced at a relatively low cost.

In conveyors, vehicles and equipment of the type mentioned above, metal wheels have been used for many years. However, one of the chief problems encountered in the use of these wheels has been the relatively short useful life of the wheel. The short life of the wheel has been caused primarily by its break-down or deterioration due to either the influence of corrosive or abrasive materials or a combination of both. Corrosive and abrasive environments have tended to relatively quickly destroy or severely damage the bearing surfaces between the wheel body and the axle or axle bushing normally journalled therein.

Attempts to improve the longevity of the wheels has led to the utilization, at one time or another, of sleeve-bearings, ball-bearings, roller-bearings, combinations of these and seals of a wide variety of types. None of the prior wheel constructions, however, have proven successful for any substantial period of time. The normal expected life span of a wheel of the type discussed herein has been about a year. At the end of this year, substances, such as fly-ash or weak acid solutions, as well as just plain water, have acted to erode and corrode the wheel and axle assembly to the point that either or both of these elements must be replaced.

The wheel assembly of the invention has been designed to overcome the disadvantages inherent in prior wheel arrangements. This has been accomplished by the development of a combination labyrinth-lubricant seal system which acts to provide a lubricant seal of the wheel and axle bearing surfaces to protect them from the influence of corrosive and abrasive materials.

The labyrinth portion of the seal ordinarily consists of a pair of annular discs or plates which are positioned in a preformed recess in each of the axial ends of the wheel body. The annular plates or discs serve to provide a labyrinthine passage adjacent the ends of the wheel. This labyrinth structure acts to receive and retain a lubricant, such as grease, introduced therein. The floating annular plates or discs are axially retained in the end recesses of the wheel by locking rings. One of the annular discs or plates is ordinarily formed with a plurality of axially extending enlargements which serve to space the particular annular disc or plate from the end surface of the recess and the other of the annular discs or plates.

Thrust-bearing washers are positioned in bridging relationship with respect to the open ends of the wheel recesses and serve as elements of the labyrinth-lubricant sealing systems of the invention.

The lubricant employed in the sealing system of the invention is preferably a grease lubricant which is highly impervious to water; is resistant to emulsification in water; has a relatively high viscosity at wheel operating temperatures; is resistant to hardening in operation; has good shear characteristics; and maintains an acceptable viscosity level at temperatures of between —50° F. and 300° F.

Because of the effectiveness of the floating labyrinth-lubricant seal system of the invention, it is possible in many applications to utilize very hard metal materials, which could not have been used in prior wheels, and which can be machined to relatively close operating tolerances. Therefore, it has now become possible to employ ductile iron as the basic material in fabricating wheels of the invention. Due to the high hardness of this ductile iron, it is necessary to anneal the wheel body casting so that it may be machined to the predetermined tolerances required and then re-hardened prior to use.

The combination of the labyrinth-lubricant seal system and ductile iron metal composition of the wheel makes it possible to produce a relatively long wearing and inexpensive wheel assembly which will ordinarily far outlast those utilizing sleeve, ball, and roller bearings.

Of further importance in connection with the wheel of the invention, the labyrinth-lubricant seal system has been found to operate particularly effectively in connection with an end thrust bearing washer. This thrust bearing not only serves to accommodate the wheel to applications which involve a high degree of thrust forces, but the bearing also serves as an integral element of the labyrinth-lubricant seal of the invention.

The lubricant, which is selected for its required lubricating properties, serves as the primary seal of the labyrinth-lubricant seal system of the invention and prevents penetration of corrosive or abrasive materials between the bearing surfaces of the wheel body and axle assembly. The labyrinth structure acts as a device for directing lubricant into desired portions of the assembly and to retain lubricant where desired. Normal periodic lubrication of the system, which lubrication is accomplished by introducing the lubricant into the approximate center of the wheel and then extruding it outwardly therefrom, serves to move exhausted lubricant axially outwardly from the wheel recesses.

Various other objects and advantages of the invention will hereinafter become more fully apparent from the following description of the drawings illustrating presently preferred embodiments thereof and wherein.

Figure 1:
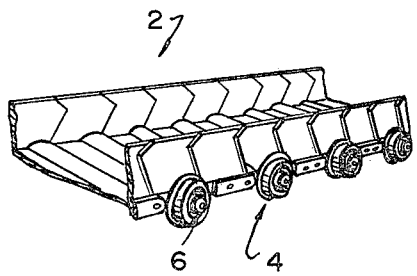
FIG. 1 is a perspective view of a conveyor segment embodying the wheel construction of the invention.

FIG. 1 illustrates the wheel assembly of the invention in a typical conveyor system environment, such as might be utilized in an ash handling apparatus. Ash handling conveyors are ordinarily designed to pass through a water bath in which hot ash is quenched and to carry the quenched ash particles to a point of remote discharge. This provides a relatively severe test for wheels of the invention since the ash in the quench bath tends to produce a mildly corrosive acid condition in the quench bath as well as a very abrasive condition both within and outside the bath. While the wheel of the invention is discussed in terms of use in conveyor systems, it is understood that the subject wheel assembly can be employed in a variety of devices, such as idler wheels in military track-driven vehicles or earth-moving equipment of the caterpillar type.

In FIG. 1, the conveyor is generally designated 2 and the wheel assemblies thereof are generally designated 4.

Figure 2:
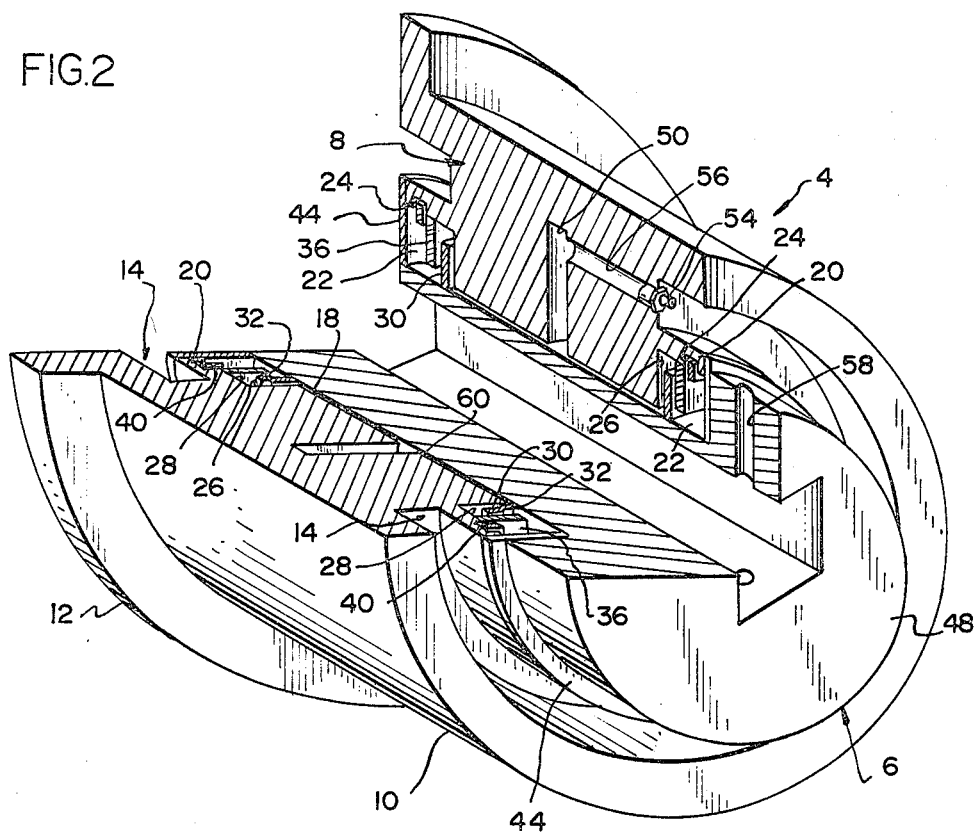
FIG. 2 is a perspective view of the wheel assembly of the invention with some parts thereof broken away.
Figure 3:
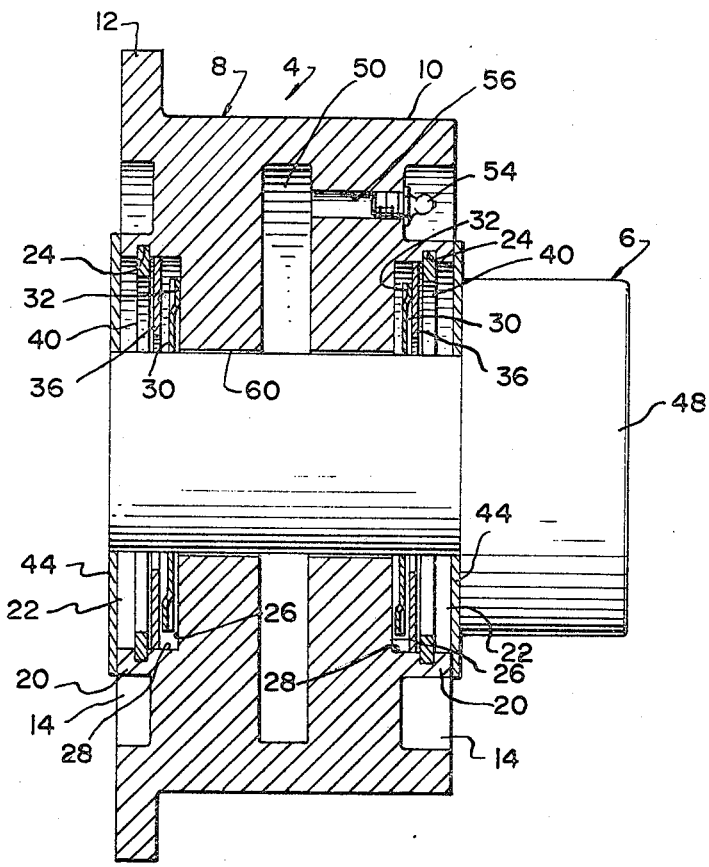
FIG. 3 is a cross-setcional view of the wheel assembly illustrated in FIG. 2.

FIGS. 2 and 3 illustrate the construction of wheel 4 including an axle bushing 6 journalled in the wheel body. While an axle bushing is discussed herein, in many applications a simple axle may be journalled in the wheel body. In fabricating the wheel 4, it is preferred that the body thereof is formed from a ductile iron casting to provide a high degree of hardness and to enhance the life of the wheel assembly. Normally, the casting is annealed, and the wheel body is subsequently machined to predetermined and relatively precise operative tolerances. Following the annealing and machining of the wheel body casting, the machined wheel is rehardened to place it in condition for use.

Referring to FIGS. 2 and 3, it can be seen that the wheel 4 is provided with a body, generally designated 8. The body 8 has a generally cylindrically-shaped outer surface 10 which is designed to roll upon or is in contact with a track or other suitable surface. An integrally formed flange or rim portion 12 is provided on one end of the body 8 and projects generally normally from the cylindrical peripheral surface 10.

The axially outermost end of the machined casting forming the wheel body 8 is provided with an annular groove 14 and the axially innermost end of the wheel body 8 is provided with a similar annular groove, also indicated 14, spaced below rim 12. (Throughout the specification substantially equivalent structures are denoted with identical numerals.) The wheel body 8 is formed with an annular axle bushing passage 18, which extends longitudinally through the body 8 and on the axis thereof. The machined wheel body casting 8 is formed with a pair of essentially identical cylindrical bosses 20 which project axially from opposed ends of wheel body 8 and serve as axial extensions of passage 18. As can be seen in both FIGURES 2 and 3, the cylindrical bosses 20 are provided with generally cylindrical recesses 22 which open radially and axially outwardly from axle bushing passage 18. Recesses 22 are further provided with radially outwardly extending recesses 24 which are spaced axially outwardly from inner end surfaces 26 of recesses 22 and are formed in cylindrical surfaces 28 of each of the recesses 22. Each cylindrical boss 22 in combination with its respective recesses serves to provide the housing for the labyrinth-lubricant seal system of the invention.

As can be seen in both FIGURES 2 and 3, first generally annular spacer members 30 are positioned axially in each recess 22 and in abutting relationship with an inner end surface 26 thereof. The inner diameter of the annular opening of spacer members 30 substantially equals the diameter of axle bushing 6 but has a tolerance sufficient to permit free floating rotation of the axle bushing 6 with respect to each spacer member 30. The diameter across the first annular spacer members 30 is substantially less than the diameter of recess 22.

Figure 4:
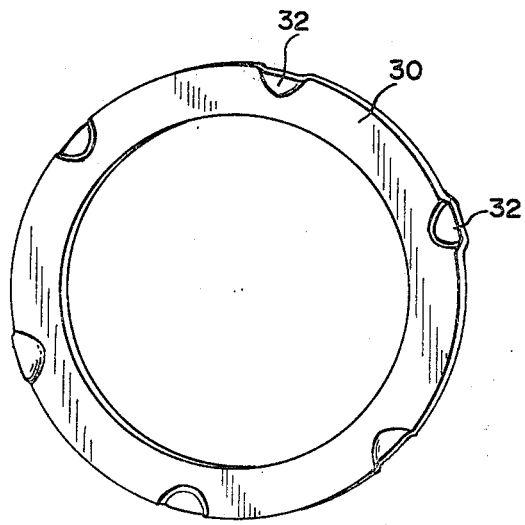
FIG. 4 is a perspective view of an annular spacer plate or disc of the invention.

As is best shown in FIG. 4, the first annular spacer member 30 is preferably formed with a plurality of raised portions 32. These raised portions are ordinarily formed during the stamping of the spacer member. FIG. 4 shows that the raised portions 32 are ordinarily formed in a manner such that radially adjacent raised portions are located on opposite sides of the spacer member 30. The purpose of the raised portions is two-fold. First, it is desired to space the first spacer member 30 from an adjacent spacer member in providing a labyrinth-lubricant path. In some applications, the raised portions will also space the member 30 axially outwardly from recess end surface 26. Second, by providing the first annular spacer member 30 with the raised portions formed on opposed surfaces thereof, it makes it impossible for mechanics in maintaining the wheel 4 from improperly installing spacer member 30 in recess 22.

Again, referring particularly to FIGS. 2 and 3, second annular spacer members 36 are positioned axially in each of the recesses 22 and are positioned in contact with raised portions 32 on the first annular spacer members 30. Each of the second spacer members 36 is formed with a diameter across the annular opening thereof substantially greater than the diameter of the axle bushing 6. The diameter across the spacer member 36, however, is substantially equal to the diameter of the recess 22 with allowances made for installation tolerances. While the first spacer members 30 are formed as generally flat annular plates or discs provided with a plurality of spaced peripheral raised portions 32, the second annular spacer members 36 are ordinarily formed only as generally flat annular plates or discs.

Both the first and second spacer members 30 and 36 are retained in respective recess 22 in generally axial floating relationship by resilient metallic snap-rings 40 which are resiliently disposed within radial recesses 24. Each snap-ring 40 is preferably formed with a peripheral split construction which permits the physical compression of a portion thereof and permits its removal from radial recess 24 when it is desired to replace or maintain the labyrinth-lubricant seal.

Thurst-bearing washers 44 are positioned over the exposed end surfaces of each of the bosses 20 as shown in FIGS. 2 and 3. These washers bridge recesses 22 formed in the wheel body 8. Each of the thrust-bearing washers 44 has an overall diameter substantially equal to the diameter of cylindrical boss 20. The diameter across the annular opening of thrust-bearing washer 44 is substantially equal to the overall diameter of axle bushing 6 with machine tolerances sufficient to permit the relative rotation of the washer 44 with respect to the axle bushing 6.

As can be seen in FIGS. 2 and 3, both axial ends of the body of wheel 4 are formed with substantially identical labyrinth-lubricant seal structures, i.e., both include the same recessing arrangement, spacer members, snap rings and thrust-bearing washers. Also, while the head 48 of the axle bushing 6 is shown to project from one end of the wheel 4, it can be disposed at either end of the wheel depending upon the application and where it is desired to place rim 12 with respect to the rail or surface which the wheel contacts.

The wheel body 8 is provided with a generally centrally located annular lubricant reservoir 50. In pumping lubricant into the labyrinth system of the wheel 4, it is preferred that the lubricant be introduced through a common Alemite fitting 54 which establishes communication with annular lubricant reservoir 50 through longitudinally extending passage 56. In some applications, it may be desirable to introduce lubricant through a passage system 58, partially shown in FIG. 2, wherein lubricant is introduced through an Alemite fitting mounted on the bushing head 48 (not shown), pumped through passage 58 formed therein and into a passage formed in the axle (not shown) and finally through a passage (not shown) formed in axle bushing 6 which establishes communication with annular lubricant reservoir 50. Either of these systems is an acceptable mode of introducing or pumping a lubricant into the reservoir 50 formed centrally in the wheel body 8.

Considering a wheel 4 with the axle bushing 6 thereof in place, as shown in FIGS. 2 and 3, when the lubricant is pumped into reservoir 50, it extrudes axially outwardly in both axial directions along a channel 60 formed by machining tolerance differentials between the wheel body 8 and the axle bushing 6. The lubricant is forced into the recesses 22 wherein it initially forces members 30 radially outwardly and its direction is ultimately changed in each of the recesses approximately 90° by the close fitting but axially floating first annular spacer members 30. The lubricant moves radially outwardly between the walls of spacer members 30 and inner end surfaces 26 of recesses 22 and, again, is forced, this time, to turn 180° by the close fitting second annular spacer members 36. The lubricant is then forced radially inwardly between the spaced walls of spacer members 30 and 36 until it is again permitted to reverse its course 180° radially outwardly. The lubricant ultimately fills the remainder of the recesses 22 and some of the lubricant is permitted to extrude from between the end surfaces of bosses 20 and thrust-bearing washers 44.

Generally, in pumping lubricant into the wheel after the wheel has been in use for a period of time, sufficient lubricant is added to the seal to extrude exhausted lubricant from the respective labyrinths.

While the labyrinths provided by the wheel body 8, which include the first and second spacer members 30 and 36, the snap-rings 40, the thrust-bearing washers 44, and the axle bushing 6 provide a close tolerance seal of the bearing surfaces between the wheel and the axle bushing, the lubricant used to lubricate the assembly is designed to serve to provide the primary abrasive and corrosive material eliminating seal. In using the wheel assembly of the invention, it has been found that "Novatex EP" lubricant provides satisfactory results. "Novatex EP" is a trademark employed by Texaco, Inc. to identify a grease lubricant.

It is preferred that the primary lubricant seal of the invention be provided by a lubricant having a viscosity in the range of about 1130 SSU at 100° F. and about 78 SSU at 210° F. It is desired that the lubricant maintain a viscosity in the above ranges at between a −50° F. and 300° F. The lubricant used for the primary labyrinth seal must be capable of resisting wash-out by roll-oil solutions, water, or other liquid environments in which the wheel may be immersed in use. It is also preferable that the lubricant be substantially impervious to water and highly resistant to emulsification by water.

Therefore, in utilizing the wheel, the axially floating spacer members of the labyrinth seal, and lubricant seal in combination to provide a floating labyrinth-lubricant sealing system, it has been found that resistance to corrosive and abrasive environments reaches such a magnitude, that the very hard long-lasting ductile irons may now be employed in fabricating such wheels, due to their extended life, although metals other than ductile iron may be used in the manufacture of wheels of the invention.

Various modes of carrying out the invention are contemplated as being within the scope of the following claims particularly pointing out and distinctly claiming the subject matter which is regarded as the invention.

I claim:

1. A wheel construction, the wheel having a body, an opening therein for an axle, and a labyrinth-lubricant seal for the axle, the labyrinth-lubricant seal comprising wall means forming a generally cylindrical recess in the body bordering the axle opening, the recess having an end surface disposed substantially normal to the cylindrical surface thereof and open opposite therefrom, a first annular spacer member disposed in the recess provided in the body of the wheel, the diameter across the opening of the first annular spacer member being substantially equal to the diameter of the axle opening therein, the diameter across the first annular spacer member being less than the diameter of the cylindrical recess provided in the body of the wheel, the first annular spacer member being disposed adjacent to the end surface of the cylindrical recess, a second annular spacer member disposed in the recess adjacent to and axially outwardly from the first annular spacer member, means disposed between the first and second spacer members for spacing them axially apart, the second annular spacer member having a diameter across the opening thereof greater than that of the axle opening, the diameter across the second annular spacer member being almost equal to that of the cylindrical recess to provide a close fit between the spacer member and the portion of the wheel body bordering the cylindrical walls of the recess, means for retaining the first and second spacer members in the recess, and means for introducing a lubricant into the recess provided in the body of the wheel and between the spacer members disposed therein.

2. The wheel construction of claim 1 wherein thrust bearing means are disposed on the wheel axially outwardly of the spacer members and forms a third element of the labyrinth lubricant seal.

3. The wheel construction of claim 2 wherein the lubricant introduced into the labyrinth serves as a seal to prevent contamination of the wheel or an axle by corrosives or abrasives.

4. The wheel construction of claim 3 wherein the lubricant is introduced into the labyrinth through an axle journaled in the axle opening thereof.

5. The wheel construction of claim 3 wherein the wheel body is provided with means for introducing lubricant therethrough into the labyrinth.

6. The wheel construction of claim 3 wherein the lubricant has a viscosity of between about 1130 SSU at 100° F. and 78 SSU at 210° F.

7. The wheel construction of claim 1 wherein a second labyrinth seal is formed on the side of the wheel body opposite the labyrinth lubricant seal thereof.

8. The wheel construction of claim 1 wherein the means disposed between the first and second annular spacer members for spacing them axially apart in the recess of the wheel body includes at least one axial enlargement on one of the spacer members for spacing contact with the other of the spacer members to permit lubricant to flow therebetween.

9. The wheel construction of claim 8 wherein the axial enlargement is disposed on the first annular spacer member and opposite the second spacer member.

10. The wheel construction of claim 9 wherein the first annular spacer member is provided with axial enlargements on opposed end surfaces thereof to space the first spacer member from the end surface of the recess on one side and from the adjacent surface of the second spacer member on the other side and to prevent accidental improper placement of the first spacer member in the recess of the wheel body.

11. The wheel construction of claim 1 wherein the wheel body is formed from ductile iron, which is annealed, machined to predetermined close tolerances and hardened for use prior to the use thereof as a wheel.

12. The wheel construction of claim 1 wherein generally annular thrust bearing means are disposed on the wheel body axially outwardly of the spacer members and in overlapping relationship with the outer peripheral edges defining the outermost end of the recess bordering the axle opening in the body of the wheel sealing lubricant is introduced into the recess between the wheel body, the first and second spacers and the thrust bearing and seals the labyrinth against contamination by corrosive or abrasive substances, and wherein one of the spacer members is provided with at least one axially projecting enlargement to maintain a lubricant passage between the first and second spacer members in the recess of the wheel body.

References Cited

UNITED STATES PATENTS

| | | | |
|---|---|---|---|
| 1,003,380 | 9/1911 | Spaeth et al. | 308—115 |
| 3,336,089 | 8/1967 | Krickler | 305—14 X |
| 3,361,497 | 1/1968 | Stengel | 277—53 X |
| 3,420,590 | 1/1969 | Bilocq | 308—18 X |

FOREIGN PATENTS 669,437    12/1938    Germany.

SAMUEL ROTHBERG, Primary Examiner

U.S. Cl. X.R.

277—53, 59; 305—14